Feb. 15, 1955 H. HOFMANN 2,701,967
RING BALANCE
Filed Jan. 17, 1952

INVENTOR
Heinrich Hofmann
BY Morgan, Finnegan and Durham
ATTORNEYS.

United States Patent Office 2,701,967
Patented Feb. 15, 1955

2,701,967

RING BALANCE

Heinrich Hofmann, Au b./Wadenswil, im Zopf., Switzerland, assignor to Landis & Gyr, A. G., a corporation of Switzerland Application January 17, 1952, Serial No. 266,907

Claims priority, application Switzerland February 27, 1951

4 Claims. (Cl. 73—405)

The present invention relates to a novel and improved ring balance, especially adapted for measuring relatively low differences in pressure.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate two embodiments of the invention, and together with the description, serve to explain the principles of the invention.

The present invention has for its object the provision of a novel form of ring balance of improved sensitivity and reliability. A further object is the provision of a ring balance which can be more easily assembled, and reassembled, and which has a more certain zero setting over a wide range of operating conditions.

In ring balances, especially for the measurement of low-pressures, the flexible tubing used for the pressure lines is frequently of rubber or flexible plastic tubing, which are mounted by being slipped on between stationary connections and connections provided on the ring body. These pressure lines apply differences of pressure to the ring body and if possible are intended to oppose no disturbing resistance to the rotation of the ring.

However, the conventional arrangements of this kind do not accomplish this purpose satisfactorily. Rubber or plastic substances are very sensitive to changes of temperature and pressure, becoming considerably stiffer with decreasing temperature, an increase of pressure likewise producing such a stiffening effect. At the same time even small stresses on such pressure lines have a very detrimental effect on the ring body in motion, even in the position of rest or zero, giving rise to measuring errors, such as torsional stresses caused by faulty tube mounting and twisting of the tube, or through the arrangement of the ponts of attachment relative to each other or the ring body. These factors have been neglected in the known ring balances or the pressure lines as usually arranged and give rise to the danger that serious sources of error are produced. Manufacturers of such balances often publish special directions for the appropriate mounting of their products.

According to the present invention the drawbacks described are eliminated, and the ring balance has the pressure in its flexible pressure lines leading to its ring body relieved in the zero position and these lines cross the axis of rotation of the ring body in the normal or zero position.

Figure 1:
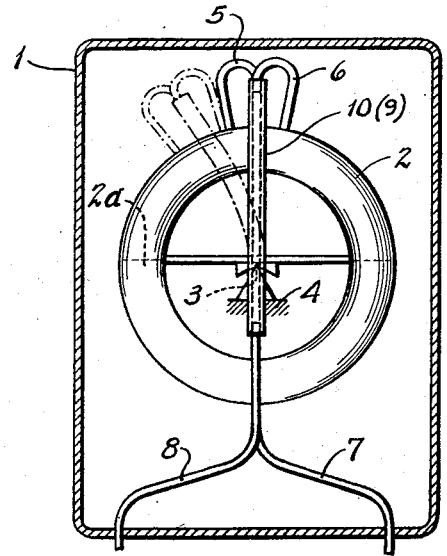
Figure 1 is a front elevation of a typical, preferred and illustrative embodiment of the invention, with certain parts shown in several positions by the dot-dash lines, and with the case broken away.
Figure 2:
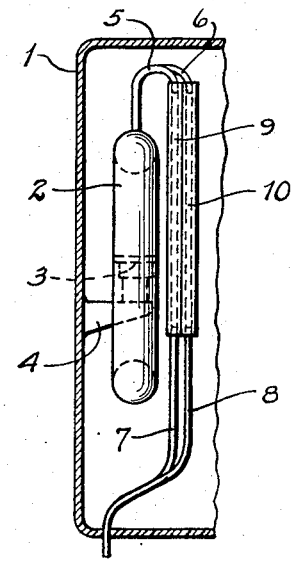
Figure 2 is a side elevation of the parts shown in Figure 1, other parts of the case being broken away.
Figure 3:
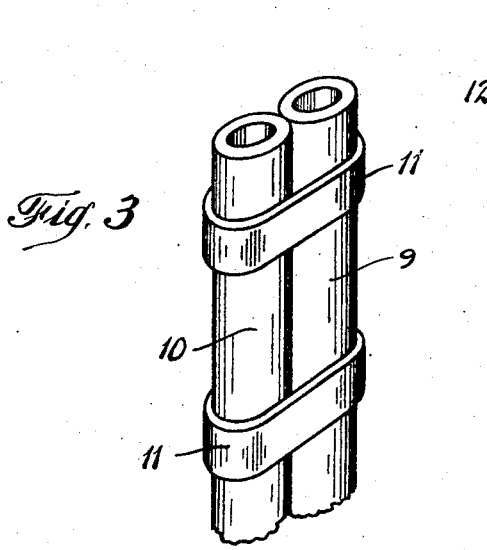
Figure 3 is a fragmentary detail of the tubing used in one embodiment of the invention.

Figures 1 and 2 of the drawing illustrate the preferred form of the present invention in which the ring balance is mounted within a casing 1. The ring balance comprises the ring body 2 which may be of conventional construction such as is shown in the prior patent to Laternser No. 2,456,713 granted December 21, 1948, and is mounted for pivotal movement about its axis by means of the knife edge bearing 3 on a bracket 4 which projects inwardly from the rear of the casing 1. At its uppermost part, the ring body 2 is divided by means of a radial wall (not shown) which closes the hollow interior of the ring body 2, and thereby prevents unrestricted annular flow of the liquid within the ring body, and allows the pressure difference to be applied to the two ends of the heavy liquid body 2a in the lower half of the ring body 2. At the upper portion of the ring body 2, and at either side of the dividing wall is a rigid tube 5 or 6 communicating with the interior of the ring body and through which pressure may be applied to the liquid within the ring body 2. The open ends of the tubes 5 and 6 are bent over to project downwardly in a plane close to the ring body 2 and parallel thereto.

At the lower part of the casing 1 are two rigidly mounted pipes 7 and 8 which have their free ends projecting upwardly and at which are available the fluids whose pressure differences are to be measured. The open ends of pipes 7 and 8 preferably lie in the same plane as the open ends of the tubes 5 and 6 and tubes 5 and 6 are adapted to be connected to tubes 7 and 8 respectively, parts 5 and 8 being arranged on one side of the ring axis while parts 6 and 7 are arranged on the other side.

Tubes 5 and 6 are connected with pipes 7 and 8 respectively by means of individual highly flexible tubes 9 and 10 which are preferably substantially straight when the ring body 2 is in its zero position. In this position, the tubes are preferably substantially in a plane which is radial with respect to the ring body 2 and the knife edge bearing 3, the tubes 5 and 6 and the pipes 7 and 8 being alined in an axial plane at their ends which are joined by the flexible tubings.

The flexible tubes 9 and 10 comprise highly flexible, relatively thin walled tubes formed of suitable plastic material such as natural or synthetic rubber, polyethylene, vinyl polymers, or the like. These tubes 9 and 10 preferably both intersect or cross the axis about which the ring body 2 is pivotally mounted.

Figure 1, in dot-dash lines, shows the positions of tubes 5 and 6, 9 and 10 in one position of displacement from the normal or zero position. In the zero position, the tubes 9 and 10 are equally stressed and as the tubes 9 and 10 are both straight in the zero position, corresponding to no pressure difference, slight differences in pressure cause an equal effect on the tubes 9 and 10 and allow the ring balance to pivot without being influenced by the varying effect of the different pressures in tubes 9 and 10.

It has been found that the bending stresses are minimized and the accuracy of the instrument is improved when the distances from the lower ends of the connecting tubes 5 and 6 are spaced from the axis of the ring body 2 considerably more than the distance between the upper ends of the tubes 7 and 8 and the axis of the ring body, and the optimum spacing is when the distance from the lower ends of the tubes 5 and 6 is about 2.85 times the distance of the upper ends of the tubes 7 and 8 from the axis.

The danger of the individual tubes 9 and 10 becoming twisted during assembly, or in the use of the ring balance and thereby introducing an error into the readings due to the torsional effect of these tubes on the ring balance, is substantially eliminated by connecting the tubes firmly to each other by means of the flexible bands 11 which are preferably of the same material as the tubes 9 and 10.

Figure 4:
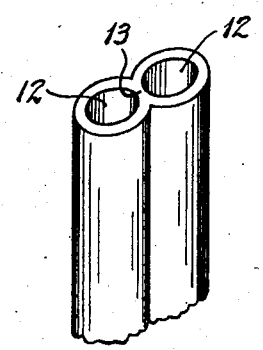
Figure 4 is a similar view of a modified form of the tubing.

Figure 4 of the drawing illustrates a modified form of the invention in which the flexible tubes are formed as a twin tube having two non-communicating parallel passageways 12 which are separated from each other by a wall portion 13 which is no thicker and is preferably thinner than the outer wall of the tubing, thereby increasing the flexibility of the tubing.

The invention has been described with reference to an instrument in which the flexible tubes 9 and 10 are arranged in a vertical position, with the points of attachment vertically disposed with respect to each other. However, such instruments are often employed in an inclined or even in an inverted position.

The invention in its broader aspects is not limited to the specific mechanisms shown and described but departures may be made therefrom within the scope of the accompanying claims without departing from the principles of the invention and without sacrificing its chief advantages.

What is claimed is:

1. A ring balance having a hollow ring body mounted for pivotal movement near the center of the ring body, two adjacent connections to the ring body, a pair of flexible tubes communicating with said connections and serving to apply differences in fluid pressure to said ring body, said flexible tubes crossing the pivotal axis of the ring body in a straight position when the ring body is in its normal position corresponding to no pressure difference in said tubes and means securing said tubes together along their lengths so as to prevent relative displacement therebetween, the points of attachment of the tube being substantially coplanar and in a plane substantially normal to the plane of the ring when the latter is in its zero-position.

2. A ring balance as claimed in claim 1 in which stationary points of attachment for the flexible tubes are located near the lower part of the ring body in a plane passing through the axis of the ring body and the points of attachment for the supply lines on the ring body are located in the zero position of the ring body in the same plane and in the same straight lines as the stationary points of attachment, so that flexible pressure lines attached at the points are in a straight line in the zero position.

3. A ring balance as claimed in claim 1 in which the flexible tubes are individual tubes bound together.

4. A ring balance as claimed in claim 1 in which the flexible tubes consist of a twin tubing in one piece.

References Cited in the file of this patent

UNITED STATES PATENTS

| | | |
|---|---|---|
| 1,569,959 | Gamble | Jan. 19, 1926 |
| 2,331,153 | Ackley | Oct. 5, 1943 |
| 2,333,834 | Vetter | Nov. 9, 1943 |